United States Patent [19]

Davis et al.

[11] 4,249,218

[45] Feb. 3, 1981

[54] METHOD AND APPARATUS FOR EDITING DIGITALLY RECORDED AUDIO SIGNALS

[75] Inventors: Donald E. Davis, Los Angeles, Calif.; Robert J. Youngouist, White Bear Lake, Minn.

[73] Assignee: Minnesota Mining and Manufacturing Company, Saint Paul, Minn.

[21] Appl. No.: 72,076

[22] Filed: Sep. 4, 1979

Related U.S. Application Data

[63] Continuation of Ser. No. 956,580, Nov. 1, 1978.

[51] Int. Cl.³ .............................................. G11B 27/02
[52] U.S. Cl. ...................................................... 360/13
[58] Field of Search ............................ 360/13, 15, 72

[56] References Cited

U.S. PATENT DOCUMENTS 4,187,544  2/1980  Larner ..................................... 360/13

Primary Examiner—Vincent P. Canney
Attorney, Agent, or Firm—Cruzan Alexander; Donald M. Sell; William B. Barte

[57] ABSTRACT

An apparatus for editing digitally recorded audio signals in which entry and exit edit points are designated based on a display of data derived from audio signal data proximate to the edit points. The apparatus enables the automatic selection and combination of portions of audio signals on at last two channels to produce a composite audio signal digitally recorded on a record medium.

4 Claims, 4 Drawing Figures

METHOD AND APPARATUS FOR EDITING DIGITALLY RECORDED AUDIO SIGNALS

This is a continuation, application Ser. No. 956,580 filed Nov. 1, 1978.

BACKGROUND OF THE INVENTION

1. Field of the Invention

This invention relates to a method and apparatus for editing and combining selected portions of previously recorded audio signals to form a composite recorded audio signal.

2. Description of the Prior Art

Digital recording of audio signals on magnetic tape has been shown to offer significant performance improvements over traditional analog recording methods. However, to be fully exploited, all functions of the recording studio should be performed in the digital domain.

One function performed in the recording studio is editing. Editing refers to a process where selected audio signals recorded on separate channels of at least one tape medium are concatenated to form an edited, composite audio signal. In prior art analog systems this is typically accomplished by physically cutting the record medium and splicing appropriate sections of the medium together.

This cut and splice technique is virtually impossible to perform successfully on digitally recorded tapes because a splice introduces physical tape distortions which prevent accurate audio signal reconstruction.

Accordingly in the digital domain, audio signals are edited by a copying process. Selected portions of the audio signals present on different channels of a record medium are copied onto a separate channel of a medium to produce an edited audio signal. The selected portions of the audio signal are defined by edit points which are designated audio signal data words which define a physical location on the record medium. Typically, an entry and exit edit point will be designated to define each selected audio portion. When the entry point for the selected portion is reached, audio signal data will be transferred by a copying process from the channel on which the audio signal is present to another separate master channel. When the exit point for that selection is reached, the copying process for the selected audio section will be completed and a new audio signal from another channel will be transcribed onto the master channel.

The primary problem in defining editing points for digitally recorded audio signals involves the location of a position within the selected audio signals where a splice may be implemented without causing audible distortion of the audio waveforms at that point. Once aurally adequate edit points have been determined, it is further required that the transcribing process be performed precisely at the designated edit points. This synchronization is required because the various audio signals may have been recorded at different times on different record media.

One prior art approach to editing digitally recorded audio signals involves copying the audio signals onto a magnetic disk memory where they are manipulated and edited to form a composite or master signal on the disk medium. The principal limitation of this prior art approach is the inability to store more than a few minutes of audio signals on a disk memory.

SUMMARY OF THE INVENTION

In order to overcome such limitations, the present invention is directed to an editing apparatus and method which permits the editing of long duration audio signals and which provides a means for automatically executing an edit function by synchronizing two media transports and transferring audio signal data precisely at the designated edit points.

The apparatus enables a method for editing and combining selected portions of digitally recorded audio signals located on separate channels on a record medium to form a composite audio signal. The method comprises the steps of:

Designating tentative entry and exit edit points, defining selected portions of the audio signals to be edited. Next, storing, the spatial locations of the tentative edit points and the audio signal data proximate to the tentative edit points. Then, displaying information which is indicative of the average amplitude of the audio signal data surrounding the edit points. The edit points are then refined based on the displayed information, and the spatial locations of these refined edit points are stored. The selected portions of the audio signals which are defined by the refined edit points are then combined to form a composite audio signal by switching between the channels which store the selected portions of the audio signals at positions defined by the refined edit points.

Controller means for accomplishing this method are provided which define, locate and automatically combine the selected portions of the digitally recorded signals at the refined edit points.

DETAILED DESCRIPTION OF THE PREFERRED EMBODIMENT

Figure 1:
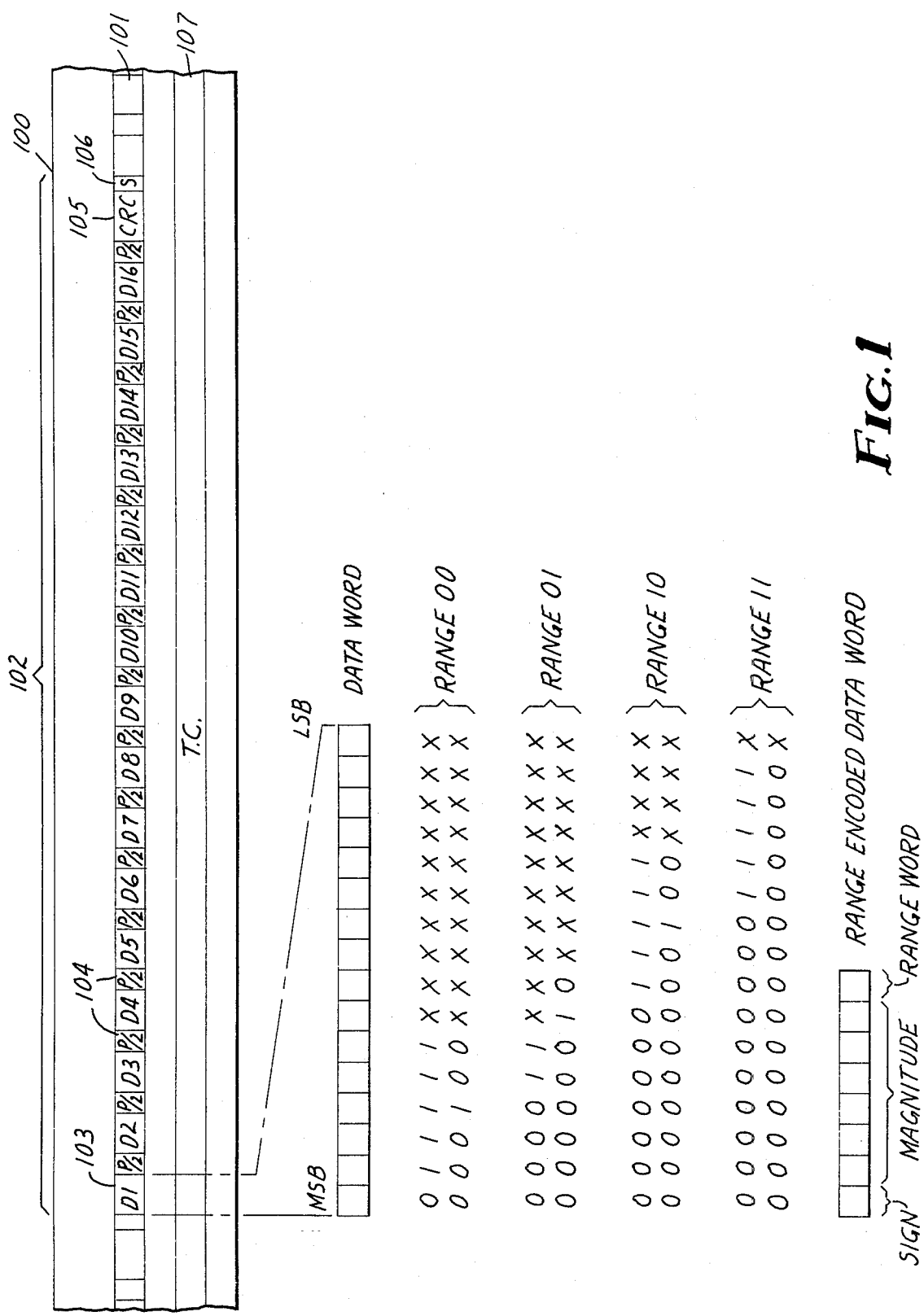
FIG. 1 is a diagram showing the encoding scheme for recording audio signals in a digital format on magnetic tape medium.

FIG. 1 shows a record medium 100 having a single channel 101 of audio signal data recorded thereon. The audio signal data is recorded in frames which are 400 bits long. Each frame 102 consists of 16 data words ($D_1$–$D_{16}$). Each data word 103 is 16 bits long and encodes a sample of the audio signal waveform. The data words are separated by 8 parity words (P). Each half parity word (P/2) 104 is 8 bits long and is used for error correction. Each frame 102 of data ends with a 12 bit cyclical redundancy check word (CRC) 105, and a 4 bit synch word (S) 106. These words are used for error detection and synchronization respectively.

Edit points which are used to define selected portions of the audio signal recorded in this format are specific audio signal data words within a specified frame on a specified channel of the record medium. Consequently, an edit point indicates a unique audio signal data word at a unique location on the record medium.

In one embodiment, the recording medium is selected to be 1 inch wide magnetic tape having 31 separate channels of audio signal data and one channel of time code information. A time code channel 107 is shown on record medium 100. Each time code word (TC) contains 80 bits of information, several of which are used to designate the physical location of a particular frame on the recording media. Information is read from or written on the record medium 100 at a rate of approximately 3,125 frames per second which corresponds to a nominal tape speed of 45 inches per second.

Figure 2:
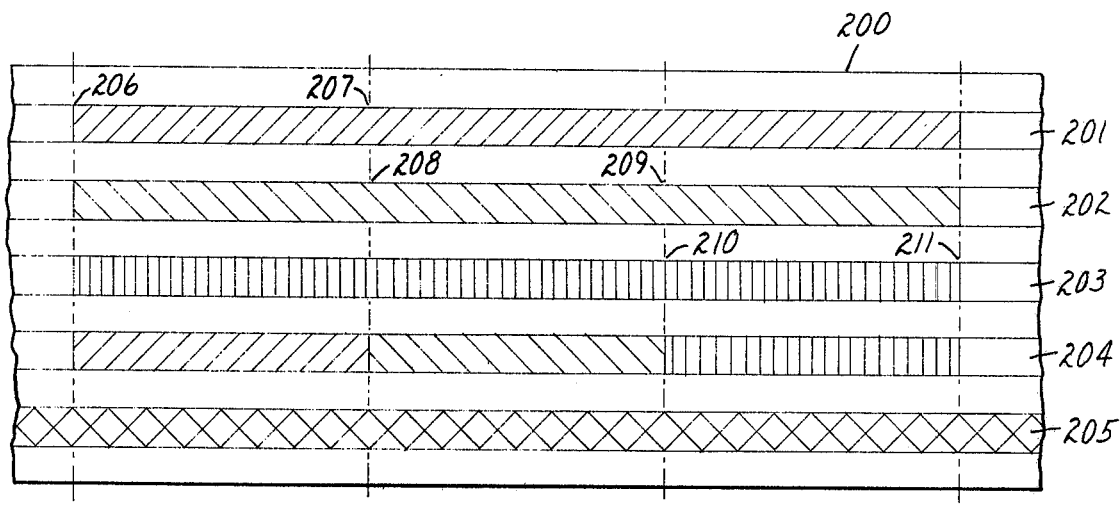
FIG. 2 is a diagram showing a typical edit performed on one record medium.

FIG. 2 is a diagram showing a typical edited tape where the record media 200 has 4 audio signal channels 201–204 and a time code channel 205. As shown in the diagram, information from channel 201, 202 and 203 are combined to form an edited composite signal recorded on channel 204. The editing process is accomplished by designating entry and exit points for each of the audio signals. Edit points which correspond to designated audio signal data words are selected for each audio signal channel. For example the edit points for the first channel 201 are shown as entry edit point 206 and exit edit point 207. When edit point 206 is reached, the audio signal from the first channel 201 is transcribed onto the fourth channel 204. When the end of the selected audio portion is reached as indicated by reaching edit point 207, audio signal information defined by edit point 208 on the second channel 202 is transcribed onto the fourth channel 204. When the exit edit point 209 on the second channel is reached, information designated by entry edit point 210 on the third channel 203 is transcribed onto channel 204. In this fashion, a composite audio signal on channel 204 is developed by switching between designated channels at positions defined by the selected edit points. It should be clear from FIG. 2 that this form of edit is only possible when the selected audio portions have been recorded simultaneously on the same record medium.

In many instances, however, selected portions of audio signals may not have been recorded on the same record media and as a consequence will not be available for the editing procedure shown in FIG. 2.

Figure 3:
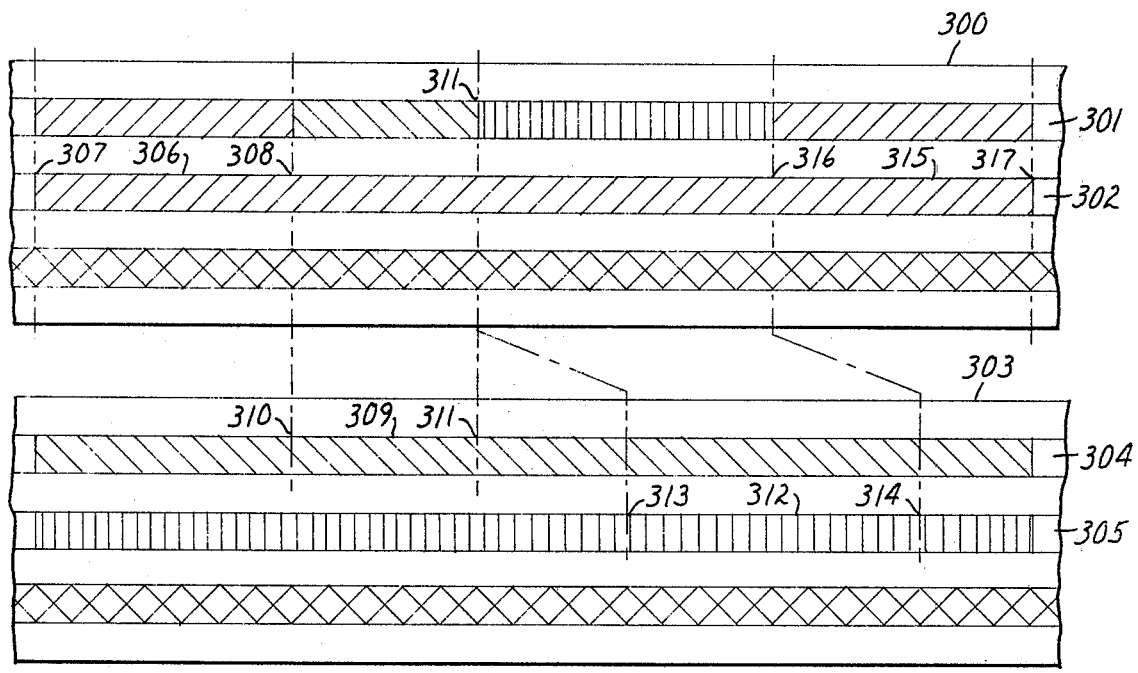
FIG. 3 is a diagram showing a typical edit performed between two record media.

FIG. 3 shows the technique for combining selected portions of audio signals recorded on separate channels of separate record media. In FIG. 3 a first record medium 300 has separate channels labeled 301 and 302 together with a time code channel (T.C.). The second record medium 303 has audio signal data recorded on separate channels 304 and 305 together with a time code channel (T.C.). The composite or edited master channel is shown as channel 301 on tape medium 300. In this edit, material present on channel 302 of medium 300 and information recorded on channel 304 and 305 of medium 303 are combined on channel 301 of media 300. To perform this type of arbitrary splice, edit points for each of the selected audio signals are defined, and the composite track 301 is formed by selectively combining selected audio portions 306, 309, 312 and 315.

This is accomplished by defining entry and exit edit points for each of the selected audio portions. To perform the above described entry and exit edit points 307, 308 for portion 306, are defined. Information is transferred from channel 302 to channel 301 at these edit points. Copying audio portion 309 requires that the two tape media 300 and 303 be synchronized at the entry edit point 310 of audio portion 309. This function is performed by controller apparatus which locates the exit edit point 308 on channel 302 and the entry edit point 310 on channel 304 and synchronizes the tape media at these edit point positions. Once the tape media are effectively slaved together at the edit points, data is transferred from channel 304 to channel 301 when edit points 308 and 310 are reached. When the end of portion 309 is reached by detecting edit point 311, the tape media must again be re-synchronized so that the audio portion 312 defined by edit point 313 and 314 coincide with the exit edit point 311 on the composite channel 301. The tape media are rewound and the speed of the transports are adjusted such that the exit edit point 311 now on track 301 coincides with entry edit point 313 of track 305. When these edit points are aligned and synchronized, data is transferred from track 305 to track 301, thus splicing audio portion 312 onto the master channel 301. When the exit edit point 314 is reached, data is transferred from channel 302 indicating by entry edit point 316 and the tape is transcribed until exit edit point 317 is reached.

It should be clear that long duration edits of an arbitrary length can be accomplished by selectively copying, and if necessary, recopying selected audio portions to compile a master channel.

The alignment and location of selected audio portions is governed by a control system which automatically positions and synchronizes tapes at selected edit points.

Figure 4:
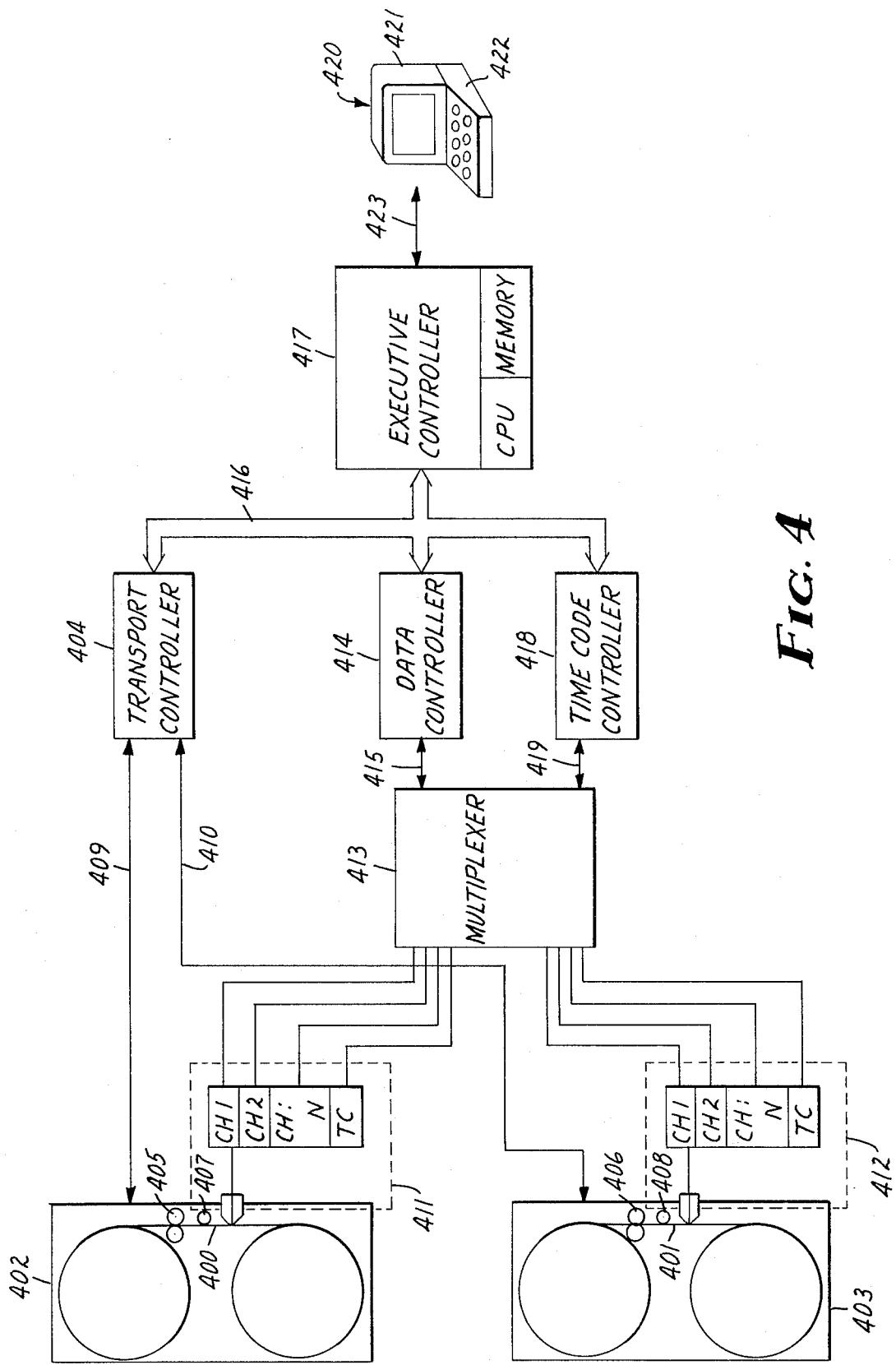
FIG. 4 is a block diagram representing the controller means of the present invention.

FIG. 4 shows the controller apparatus for performing the editing functions.

Separate recording media 400 and 401 are transported by separate transport mechanisms 402 and 403, respectively. The operation of these transports are controlled by a transport controller 404 which controls variable speed capstans 405 and 406 via communication lines 409 and 410. Each transport is provided with a position indicator means 407 and 408 which contacts the recording media and provide a continuous record of media position information which is communicated to the transport controller over communication lines 409 and 410. Read/write means which include multiple channel read and write leads, and associated electronic circuitry 411 and 412 are in contact with the recording media 400 and 401 to read and write digital information onto the recording media. The read/write means are interfaced with a data multiplexer 413 which routes data between the channels of the read/write means. The data multiplexer is under the control of a data controller 414 interfaced with the muliplexer by communication line 415. The data controller 414 is interfaced with an executive controller by means of a common bus 416.

A time code controller 418 interfaced with the data multiplexer 413 by a communication line 419 both reads and writes time code on the record media 400, 401. The transport controller 404, data controller 414 and time code controller 418 are connected to the executive controller 417 by the common bus 416.

The executive controller 417 is interfaced with a interactive data terminal 420 having a display means 421 and a keyboard means 422 by means of a communication line 423.

In operation the system operator will place the tape transports in the playback mode and will listen to the recorded audio signals. The operator will then designate the tentative entry and exit edit points for the audio data by pressing an edit locate key on keyboard 422 which causes the tape position location from the transport controller and tape position information from the time code controller to be transferred into memory 424 associated with the executive controller. Next, the transport controller is instructed to rewind the tape media and enter data word information from the data controller into memory. These data words proximate to the tentative edit point are stored in memory.

Next, these data words are manipulated within the control processing unit 423 of the executive controller to produce information indicative of the average amplitude of the audio signal. To produce an inaudible edit, the amplitude and slope of the waveforms at the exit edit point of a selected signal must match the amplitude and slope of the waveform of the entry edit point position. Appropriate edit points are most easily selected and refined by reviewing displayed data which is a function of the audio signal waveforms.

The actual data words are used to calculate display data, which assists the operator designating and refining the edit points. The 16 bit data word is capable of encoding $2^{16}$ or 65,536 states. Since the typical analog audio signal waveform ranges from +5 volts to −5 volts, each state of the encoding scheme corresponds to a −000153 voltage increment. It is difficult, however, to display this many amplitude levels on a conventional display device. This problem is overcome by the use of a ranging code which encodes the data words in an 8 bit format. In this encoding scheme the first bit of the 8 bit word indicates the sign of the waveform and the next 5 bits are used to encode the magnitude of the audio signal. The remaining 2 bits are range bits which are used to define the gross amplitude of the signal. The 2 bits of the range word are capable of encoding 4 range levels. Range bits are assigned to each data word by determining the magnitude of the word by inspecting the most significant bits of the data words. The use of the range bits permits the amplitude information of the data words to be indicated in a shorter 8 bit format. The data words modified by the range code are displayed on the display device 421. The use of the range code permits audio waveform information to be manipulated and displayed on the display screen conveniently. The data words for the audio signal data proximate to the edit point may be averaged in order to show the average amplitude of the audio signal in an expanded area proximate to the edit points. In this instance 2 through 100 data words may be averaged to display the average power or amplitude of the audio signals. By averaging a large number of modified data words the system operator can inspect the average amplitude of the audio signal in the vicinity of the edit point in a coarse fashion. As the position of the edit point is refined the operator can average a smaller and smaller number of data words to provide a greater resolution display of the audio waveform. Once a refined edit point has been designated by the operator by indicating the location of the refined edit point, the executive controller 417 instructs the transport controller 404, data controller 414 and time code controller 418 to execute the splices at the designated refined edit points.

Since the designated edit points may be at different locations upon different tape media there is a need to provide high speed search and locate function to quickly locate and synchronize the desired edit points to enable a splice to be made. Once the precise edit points have been designated the transport controller is instructed to search the tape media for the gross position of the edit point by searching first with the tape position indicator 407 to locate the approximate point on the media where the edit point is located. Next, the time code controller reads the time code from the record media bringing the frames containing the edit point into synchronization. The time code controller instructs the transport controller to vary the capstan speeds such that the edit points are synchronized on the two media. At this point, the data controller is instructed to transfer data between designated channels when the data words corresponding to edit points are detected. Once the edit points have been reached the data controller switches data between designated channels through the muliplexer 413, which begins the copying process and thus performs the editing process.

We claim:

1. A method of editing and combining selected portions of digitally recorded audio signals located on separate channels on record medium to form a composite audio signal comprising the steps of
    designating tentative entry and exit edit point words defining selected portions of said audio signals,
    storing the spatial location of said tentative edit point words,
    storing a multiplicity of audio signal data words proximate to said tentative edit point words,
    displaying information indicative of the average amplitude of said audio signal data proximate to said tentative edit point words,
    selecting refined edit point words based on said displayed information,
    storing the spatial location of said refined edit point words, and
    combining selected portions of said audio signal data to form a composite audio signal by switching between said channels at positions defined by said refined edit point words.

2. An editing system for combining selected portions of digitally recorded audio signals to form a composite audio signal including,
    a plurality of digitally recorded audio signals located on separate channels on record medium,
    read/write means for storing and retrieving said digitally recorded audio signals on said record medium,
    transport means for positioning said record medium relative to said read/write means,
    controller means for defining, locating and combining said selected portions of digitally recorded audio signals,
    wherein said controller apparatus includes,
    terminal means having a keyboard means for inputting data, designating tentative entry and exit edit point words defining selected portions of said audio signals,
    means for storing the spatial location of said tentative edit point words,
    means for storing audio signal data proximate to said tentative edit point words,
    means for calculating the average amplitude of said audio signal data proximate to said tentative edit points,
    means for displaying information indicative of the average amplitude of said audio signal data proximate to said tentative edit points,
    means for selecting refined edit points based on said displayed information,
    means for storing the spatial location of said refined edit points,
    means for locating and aligning designated channels at said refined edit points, and
    means for effecting selective data transfer between designated channels at said refined edit point words to combine said selected portions of digitally recorded audio signals to form a composite signal.

3. The editing system of claim 2 wherein said separate channels are located on first and second record media, and wherein said means for locating and aligning designated channels at said refined edit points includes
    (a) time code reader means associated with each record media for reading time code, recorded on each of said media, indicative of media position,
    (b) position indicator means in contact with and driven by each of said record media for producing continuous indication of media position,
    (c) comparison means for comparing the current record media location with said refined edit point word location,
    (d) transport controller means responsive to said comparison means for synchronizing said record media at said refined edit point words.

4. The editing system of claim 2 wherein said means for effecting selective data transfer between designated channels includes,
    means for continuously reading audio signal data words from record medium,
    means for comparing audio signal data words with said stored refined edit point word to detect said edit point word,
    switch means responsive to said comparison means for switching said audio signal data from a first designated channel to a second designated channel when said edit point data word is detected.

* * * * *